United States Patent [19]
Dan et al.

[11] Patent Number: 5,825,877
[45] Date of Patent: Oct. 20, 1998

[54] SUPPORT FOR PORTABLE TRUSTED SOFTWARE

[75] Inventors: Asit Dan, West Harrison; Rajiv Ramaswami, Ossining; Dinkar Sitaram, Yorktown Heights, all of N.Y.

[73] Assignee: International Business Machines Corporation, Armonk, N.Y.

[21] Appl. No.: 661,517

[22] Filed: Jun. 11, 1996

[51] Int. Cl.[6] ....................................................... H04L 9/00
[52] U.S. Cl. .................................... 380/4; 380/23; 380/25
[58] Field of Search ................................... 380/23, 25, 4

[56] References Cited

U.S. PATENT DOCUMENTS

| | | | |
|---|---|---|---|
| 5,005,200 | 4/1991 | Fischer | 380/30 |
| 5,283,830 | 2/1994 | Hinsley et al. | 380/25 |
| 5,412,717 | 5/1995 | Fischer | 380/4 |
| 5,450,593 | 9/1995 | Howell et al. | 395/650 |

Primary Examiner—Thomas H. Tarcza
Assistant Examiner—Carmen D. White
Attorney, Agent, or Firm—Heslin & Rothenberg, P.C.; Richard M. Ludwin, Esq.

[57] ABSTRACT

A form of authentication is provided wherein a trusted third party signs a certificate to identify the author of a program and to secure its integrity. The program code is encapsulated or otherwise associated with the certificate and an access control list (ACL). The access control list describes the permissions and resources required by the code. An enforcement mechanism which allocates system permissions and resources in accordance with the ACL. In a preferred embodiment, a code production system communicates with a certification agency, which is a trusted third party. The certification agency issues a certificate for the code and a certificate for the access list of that code. Once the certificate is issued it is not possible for any party to modify the code or access list without invalidating the certificate. The code and its ACL, along with their certificates are stored on a server. A client downloading the code or access list can verify the integrity of the code/access list and the system can enforce the access list such that the permissions and resources are not exceeded.

20 Claims, 8 Drawing Sheets

FIG. 7

```
install_code:
-----------
    Receive program code, ACL and encrypted hash;
    Decrypt using third party's public key.
    Compute hash from code and ACL;
    if computed_hash not equal decrypted_hash then
        Reject code;
        exit;
    invoke ACL manager;

execute_code:
-----------
    Insert traps in code to verify_access whenever
resource is accessed;   Execute modified code;

verify_access:
-----------
    Invoke ACL enforcer;
    If access permitted then
        continue;
    else if access delayed then
        delay program;
    else if access rejected then
        suspend program;
```

FIG. 8

```
If newly received code then
    Store code and ACL on disk;
Display ACL for program;
while more client input do
    read client input;
    Modify appropriate permission flags;
    Store modified permission flags on disk;
end
```

FIG. 9

```
check_logical_res_access:
   -------------------------

Locate RPE entries for this logical resource;
   while more RPE entries do
      while more parameters do
         if access to parameter not allowed then
            goto getNextRPE;
      end
      return access allowed;

getNextRPE: get next RPE;
   end
   return access rejected;

check_physical_res_access:
   -------------------------

Locate RPRT entry for this physical resource;
   if Max_allowed non-blank and amt.requested + used >
max allowed then          return access rejected;
   Computed projected consumption rate;
   if projected consumption rate > max. consumption
rate then       Compute required delay;
      return access delayed and required delay;
   else
      return access allowed;
```

SUPPORT FOR PORTABLE TRUSTED SOFTWARE

BACKGROUND OF THE INVENTION a. Field of the Invention

The present invention relates generally to delivery of software through distribution systems such as networks.

b. Related Art

Software distribution is a major industry currently. Software is today distributed over diskettes, CDROMs and increasingly, over networks. In addition to simply downloading code from remote sites over the Internet, today clients can download and run applets from servers, a paradigm proposed in the Java programming language or in other languages such as Telescript.

A significant concern with code obtained from elsewhere is that of security. For example, in the Unix operating system, the code will run in the client's shell with all the client's privileges, including access to all his files, as well as possibly send mail, attempt illegal break ins etc. Java attempts to solve this problem for applets by running applets in a very restrictive environment. As a result, the usefulness and functionality of Java applets is limited. Java applications on the other hand rely on the security provided by the operating system and do not come with any degree with authentication. They thus pose the same security problems as any other code.

A form of authentication is proposed in "Trusted Distribution of Software Over the Internet", A. D. Rubin, Internet Society Symposium on Network and Distributed Security, 1995. Here a trusted third party signs a certificate to identify the author of a program and to secure its integrity. While this allows a client to verify the authenticity of the code, it does not specify a flexible set of permissions associated with the code nor does it provide an automated method for the client to enforce these permissions.

SUMMARY OF THE INVENTION

In view of the foregoing, the present invention provides a form of authentication wherein a trusted third party signs a certificate to identify the author of a program and to secure its integrity. The program code is encapsulated or otherwise associated with the certificate and an access control list (ACL). The access control list describes the permissions and resources required by the code. The invention also provides an enforcement mechanism which allocates system permissions and resources in accordance with the ACL.

In a preferred embodiment, a code production system communicates with a certification agency, which is a trusted third party. The certification agency issues a certificate for the code and a certificate for the access list of that code. Once the certificate is issued it is not possible for any party to modify the code or access list without invalidating the certificate. The code and its ACL, along with their certificates are stored on a server. A client downloading the code or access list can verify the integrity of the code/access list and the system can enforce the access list such that the permissions and resources are not exceeded.

BRIEF DESCRIPTION OF THE DRAWINGS

FIG. 7 shows the pseudocode for the integrity verification, execution and enforcement initialization operations of the client system;

FIG. 8 shows the pseudocode for the ACL manager; and,

FIG. 9 shows the pseudocode for the ACL enforcer.

DETAILED DESCRIPTION OF THE PREFERRED EMBODIMENT

Figure 1:
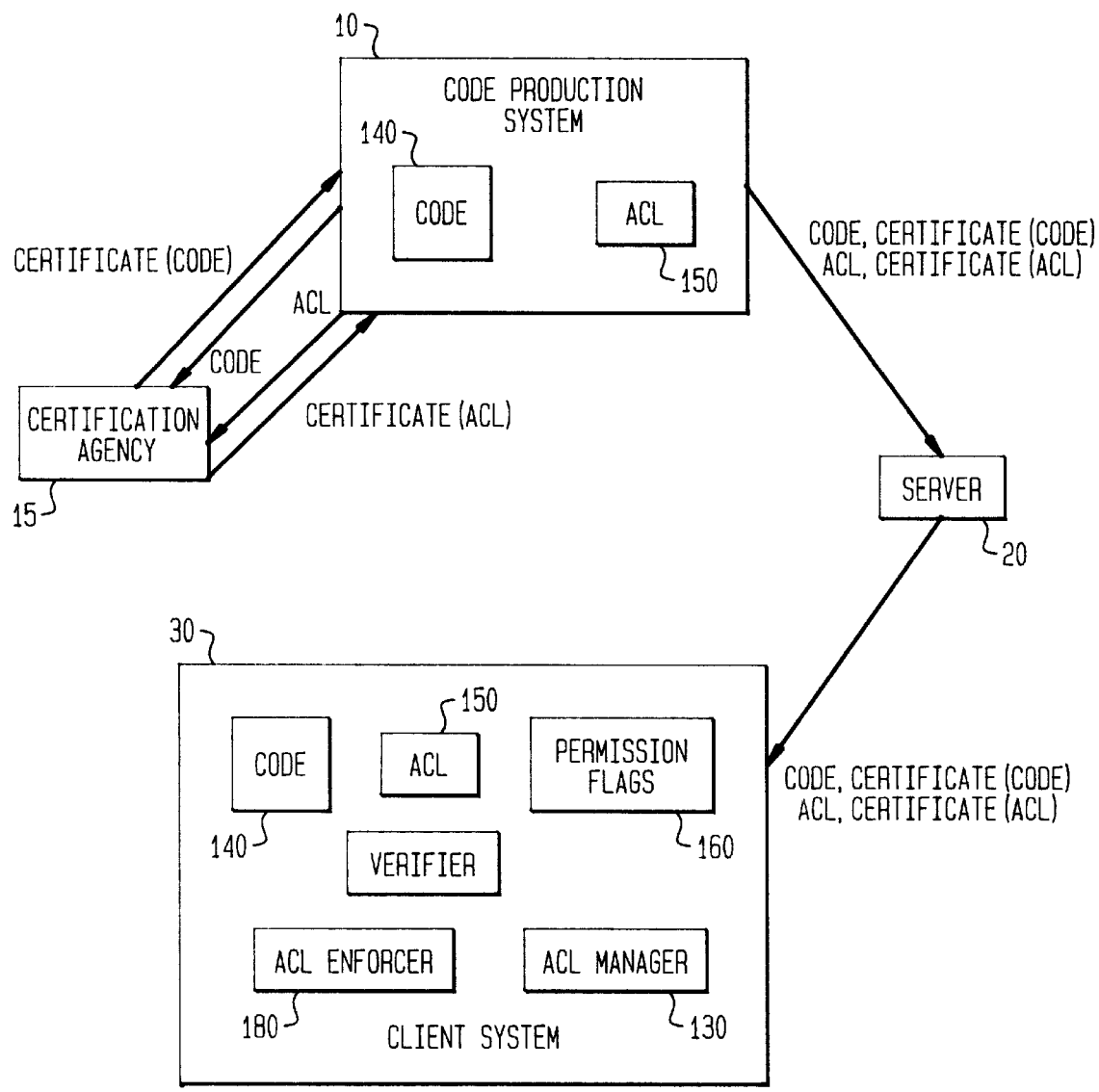
FIG. 1 shows a block-diagram view of a code delivery and certification system according the preferred embodiment of the invention.

FIG. 1 shows a block-diagram view of a code delivery and certification system according to a preferred embodiment of the invention. It includes of one or more code production systems (CPS) 10, a certification agency (CA) 15, one or more servers 20 and one or more client systems 30. The client systems can be coupled to the servers by way of a conventional Wide Area Network (WAN) or by way of a Local Area Network (LAN). The CPS has a piece of program code (code) 140 and an access list (ACL) 150 for that code that it wishes to get certified by the certification agency. The CA provides a public key K that is widely available and known to the client system. In addition the CA has a private key P that only it knows. To provide a certificate for the code the CA creates a certificate containing the code name and the cryptographic hash of the code and signs it using his private key. The certificate cannot now be changed without invalidating the CA's signature. Similarly the CA creates and signs another certificate for the ACL associated with that code (if desired there could be a single certificate for both the code and its access list). In the embodiment of FIG. 1, the client systems receive the certificate, the ACL and the code by way of the WAN or LAN. It should be understood, however, that the client systems can also or alternatively receive certified code by way of a removable storage media read by local importation device such as a floppy or optical disk drive.

Figure 2:
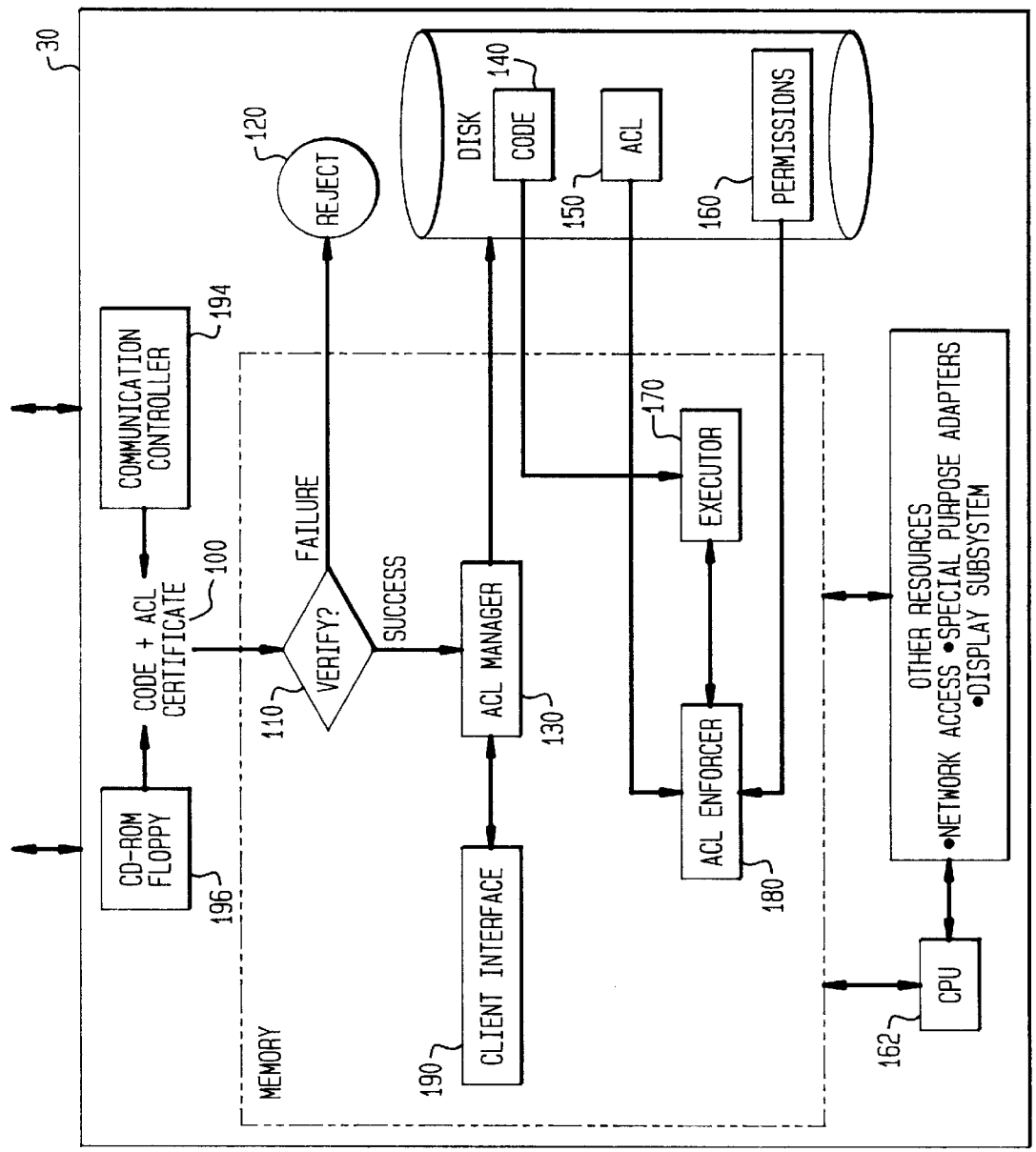
FIG. 2 shows how the different parts of the client system operate together to perform the functions described in the embodiment.

The client system shown in FIG. 2 includes a verifier 110, ACL manager 130, executor 170, ACL enforcer 180 and a client interface 190. The client system also includes a conventional CPU and associated control logic 192, a communication controller/network interface 194, a CD-ROM and/or floppy disk subsystem 196 and other resources such as network access modules, a display subsystem and various special purpose adapters. Those of skill in the art will recognize that the client system includes a number of additional, conventional components which will not be described in detail here.

The ACL manager 130 and the ACL enforcer 180 are preferably embodied as program code, the operation of which is described in more detail below. The executer is a conventional part of the client's operating system (not shown) which is used to execute the imported code on the client system. The client interface 190 can be embodied as a front of screen graphical user interface which provides the client communication with the ACL manager (e.g. it enables the client to tell the ACL manager 130 to allow or disallow or control program access to specified resource). The verifier 110 is preferably embodied as program code including a decryption module which is used to verify the authenticity of the imported code, including the access control list. The verifier also includes a hashing module which checks the integrity of the imported code and ACL.

Upon downloading the code/ACL and its certificate (100), the verifier (110) first checks to see if the CA's signature on the certificate is valid (using CA's known public key). The verifier then computes the cryptographic hash of the code/ACL and verifies that it matches the value in the certificate. If the signature is not valid or the hash does not match, the code and ACL are rejected (120). If the verification is ok, the ACL manager (130) is invoked. The ACL manager displays the ACL (described below) to the client via the client interface (190) and ascertains whether the client wishes to allow or disallow the individual items in the ACL. The ACL manager stores the code (140) as directed by the client via the client interface and stores the ACL (150) together with permission flags (160).

The resources that can have their access controlled by the ACL enforcer include both logical resources such as filesystems specific files and system calls, as well as physical resources including such things as the disk space, disk access, main memory allocation and access to various system controllers and adapters. For access to logical resources (client system facilities), the permission flags 160 indicate whether individual items are allowed or not; for access to physical resources, the permission flags can be used to indicate the maximum allowable quantity or rate of consumption.

FIG. 2 also shows how the different parts of the client system operate together. In a multi-user client system, each user may have their own set of permission flags. The ACL may also contain environment variables; changing the environment variables during execution allows individual users to customize the access privileges. The ACL and permission flags are stored in a secure area; reading or updating this area is a privilege enforced by the ACL enforcer (180).

The ACL manager may be invoked at any time by the client to display or change the permissions of an ACL. The code is run by the executor (170). Before allowing access to any resource, the executor invokes the ACL enforcer for checking the validity of the access. This is achieved by the executor 170 inserting traps in the code to a verification routine that invokes the ACL enforcer. The operation of the ACL enforcer is described in more detail later.

The system enables the code and its ACL to be downloaded separately or together as needed. For instance, the CPS may want to provide the ACL free of charge to all clients but charge for the actual code.

Figure 3:
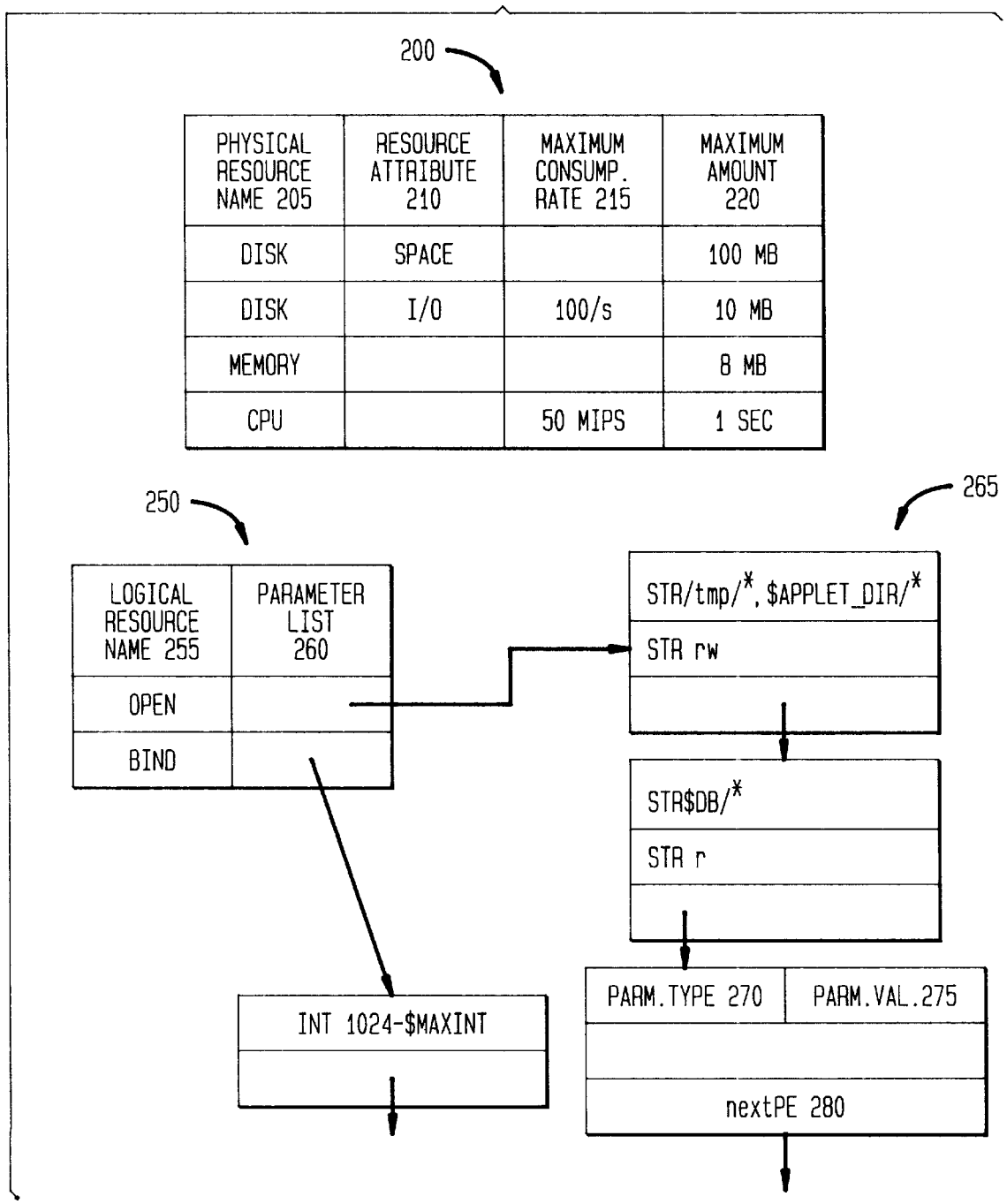
FIG. 3 shows the access control list (ACL)

FIG. 3 shows the access control list. The ACL consists of two parts: the Physical Resources Table (PRT) 200 containing the physical resources required by the code and the Logical Resources Table (LRT) 250 containing the permissions and logical resources required by the code.

The PRT 250 contains a row for each resource containing the physical resource name (PRN) 205, the resource attribute 210, the maximum consumption rate 215 and the maximum amount 220. The resource attribute 210 is used when a physical device or resource disk has multiple attributes, such as space and number of I/Os for storage devices. The maximum consumption rate 215 and the maximum amount 220 are the maximum allowable consumption rate and maximum allowable consumption of the resource and attribute respectively.

The LRT 250 contains a row for each call to an external routine required by the code (referred to as a logical resource). Each row contains the logical resource name (LRN) 255, and a parameter list 260 that points to a list of parameter entries. Each parameter entry 265 specifies a set of valid parameter ranges; i.e. a set of values for each parameter that are valid in combination, together with a field nextPE 280 that points to the next parameter entry. The parameter range for each parameter contains two fields—the parameter type 270 and the parameter value 275 that specifies the valid range for that parameter. For string parameters, the parameter type 270 is STR and the parameter value 275 is a list of regular expression that specify valid forms for the string. For integer parameters, the parameter type 270 is INT and the parm. value 275 is a list of integer ranges. The parm. value 275 may include the names of environment variables, in which case the environment variable is assumed to contain a value which is substituted at run time.

The ACL enforcer in the client ensures that the permissions and resources specified in the ACL for the code are provided and no additional permissions/resources are allowed.

The ACL enforcement may be static or dynamic. In static enforcement, the enforcement can be done fully before the code is executed and no enforcement is required while the code is running. In dynamic enforcement, the enforcement must be performed while the code is being executed. If the CA itself verifies the ACL and guarantees that they will not be exceeded by the code, then the ACL enforcement function may not be required in the client system.

Figure 4:
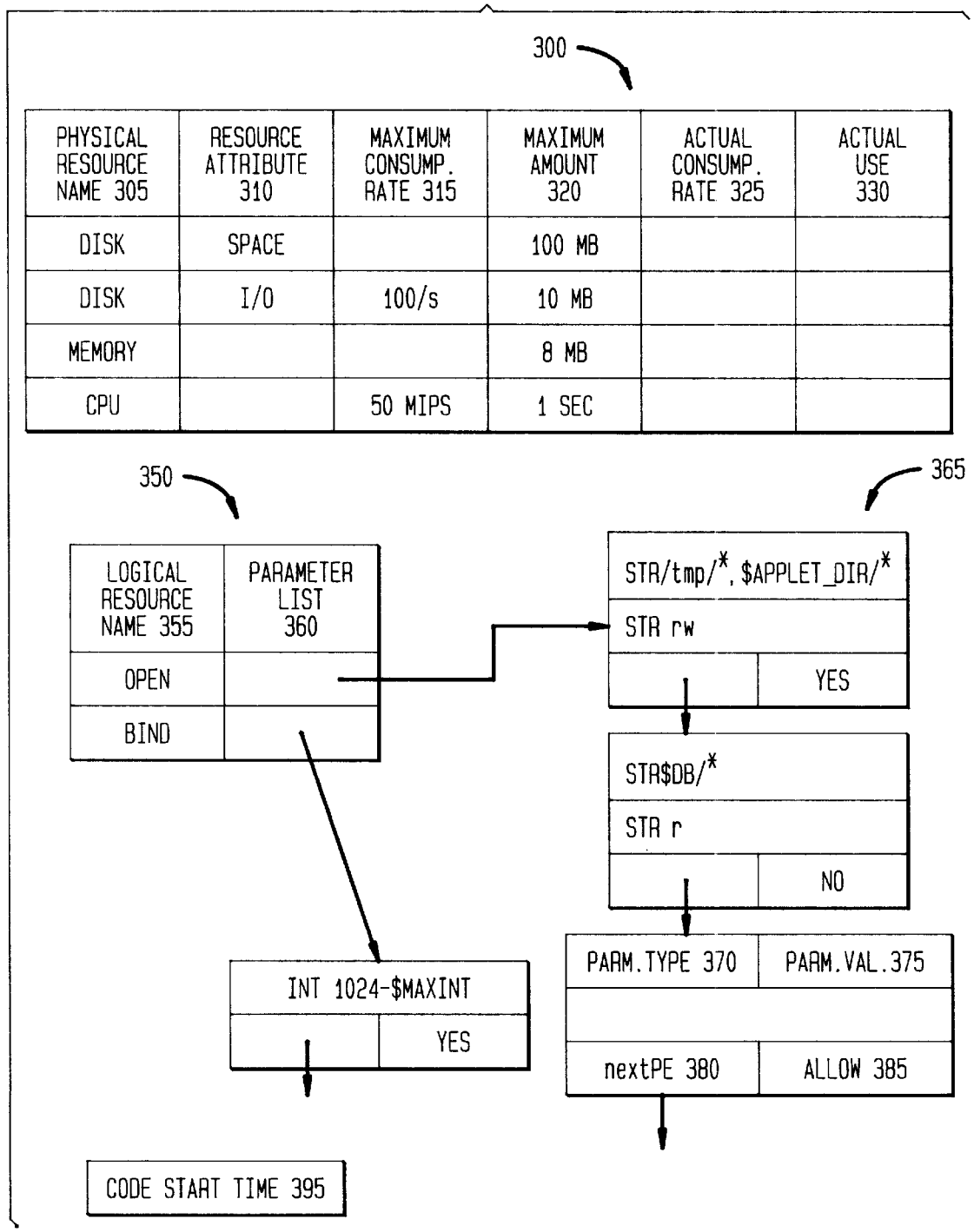
FIG. 4 shows the data structures used by the ACL enforcer.

FIG. 4 shows the data structures used by the ACL enforcer. The Runtime Physical Resources Table (RPRT) 300 contains a row for each resource. The resource name 300, resource attribute 310, maximum consumption rate 315 and maximum amount 320 are copies of the corresponding fields from the PRT 200. The actual consumption rate 325 and the actual use 330 fields are used to keep track of the actual consumption rate and the actual consumption, respectively, of the code during run time. The Runtime Logical Resource Table (RLRT) 350 contains a row for each required logical resource. The RLRT is a copy of the LRT, with an additional flag that indicates for each valid combination of parameters, whether the combination is allowed by the ACL manager or not. The Logical Resource Name 355 is a copy of the corresponding fields of the LRT 250 and the parameter list 360 points to a list of runtime parameter entries (RPE) 365. The parameter type 370, parameter value 375 values of the runtime parameter entries are copies of the corresponding fields in the LRT. The nextPE 380 points to the next runtime parameter entry 365 and the allow 385 field may be set to YES or NO indicating whether this runtime parameter entry 365 is allowed or not. The ACL enforcer also keeps track of the code start time 395.

Figure 5:
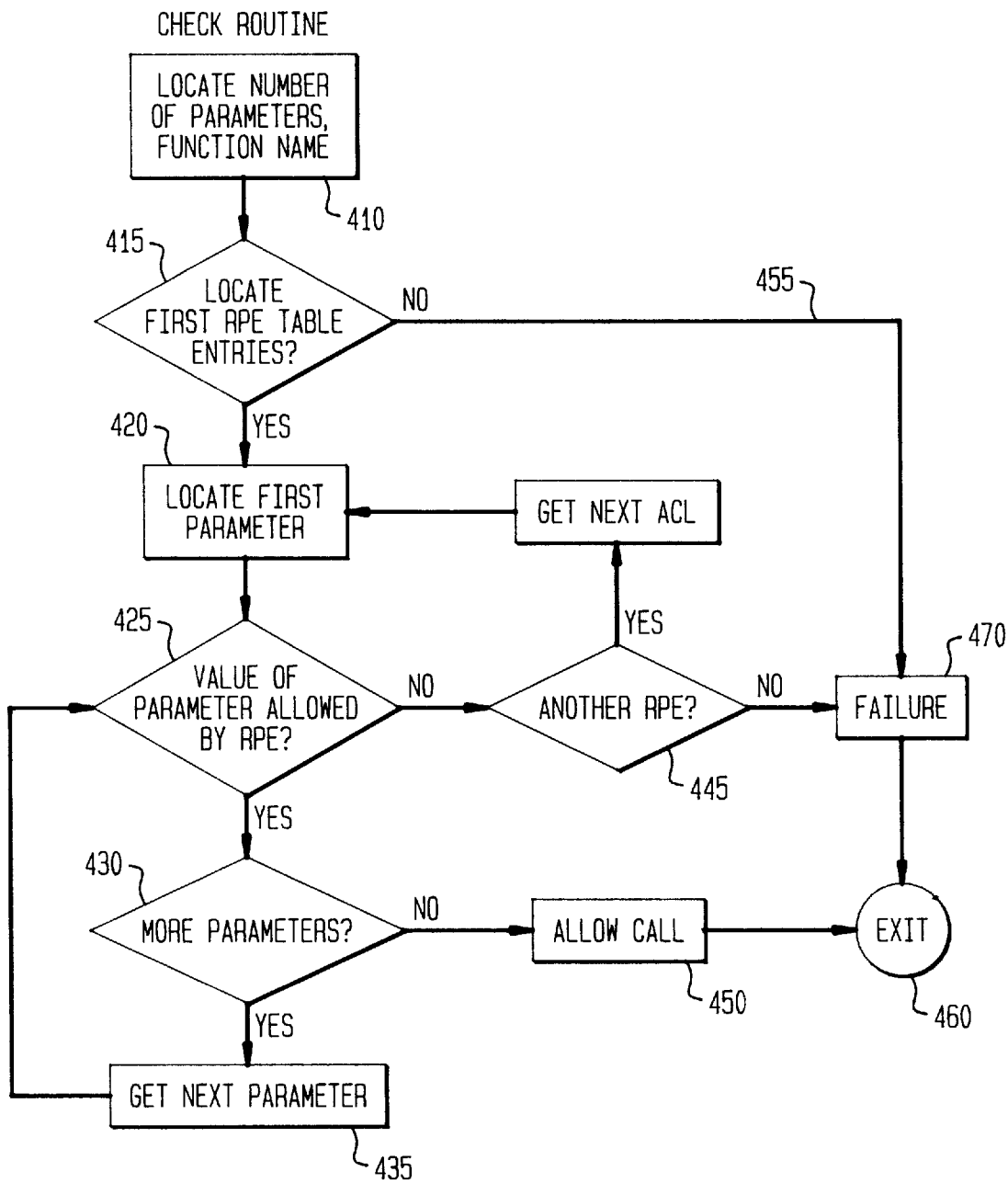
FIG. 5 shows how logical resource permissions are enforced by the ACL enforcer.

FIG. 5 shows how logical resource permissions are enforced by the ACL enforcer. This path is invoked whenever the code makes a call to an external function. In step 410, the ACL enforcer locates the number of parameters, their values, and the name of the function being invoked. The exact method for doing this is implementation dependent; for example, in Java, these are located on the operand stack. In step 415, the ACL enforcer locates the row for this function in the RLRT 350 and locates the first RPE 365 with allow set to YES. If the function name is not found, or there is no such RPE 365, the ACL enforcer proceeds to step 455 where it exits indicating that the call is not allowed. In step 420, the ACL enforcer locates the value of the first parameter and makes that the current parameter. In step 425, the ACL enforcer checks if the value of the current parameter is allowed by the RPE 365. If the value is allowed, the ACL enforcer checks in step 430 if there are more parameters. If there are, in step 435 the ACL enforcer sets the current parameter to the next parameter and returns to step 425. If no more parameters are found in step 430, the ACL enforcer proceeds to step 450 and returns with an indication that the call is allowed.

If the test for allowability fails in step 425, the ACL enforcer proceeds to step 445 where it checks the RLRT 350 to find another RPE 365 with allow 385 set to YES. If there is no such RPE, the ACL enforcer proceeds to step 455 and exits indicating that the call is not allowed. If there is such an RPE 365, the ACL enforcer proceeds to step 420.

Figure 6:
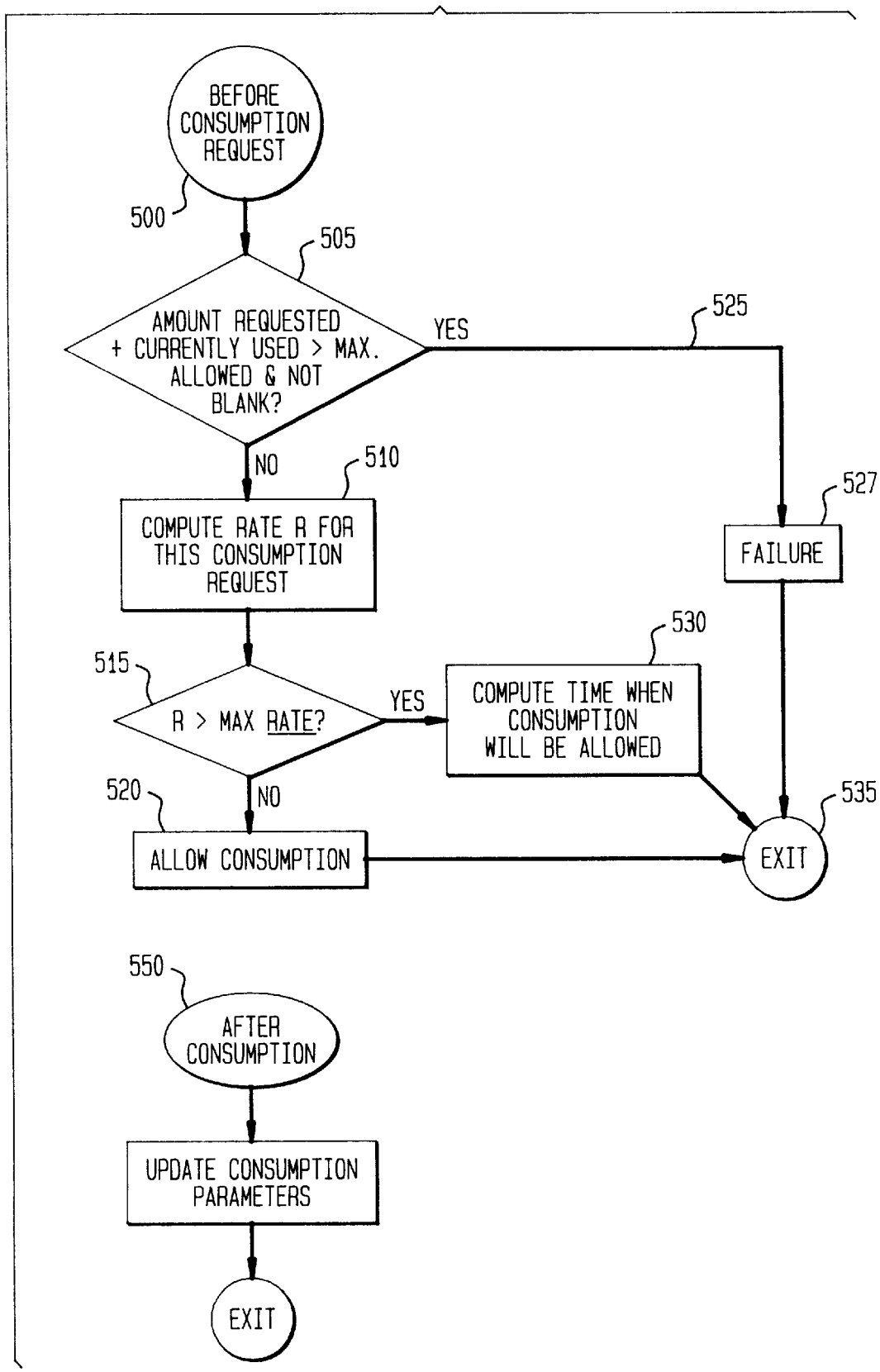
FIG. 6 shows how physical resource limits are enforced by the ACL enforcer.

FIG. 6 shows how physical requirements are enforced by the ACL enforcer. The ACL enforcer is invoked in step 500 before allocating the resource. Two parameters, the amount of the resource requested (REQAMT) and the estimated time of consumption (COMPT) are provided. For disk I/O, the REQAMT is the amount of disk I/O and the COMPT is the estimated time for the I/O to complete. In step 505, the ACL enforcer locates the row in the RPRT 300 for this resource and checks whether the maximum amount 320 is specified and the actual use 330 plus REQAMT exceeds the maximum amount 320. If so, it returns a failure in step 527 indicating that the consumption is not allowed. If the maximum amount 320 is not exceeded, in step 510 the ACL enforcer computes the projected consumption rate of this resource as (Actual use 330 +REQAMT)/(current time—code start time 395+COMPT). In step 515, the ACL enforcer checks to see if the maximum consumption rate 315 is specified and if the projected consumption rate is greater than the maximum consumption rate 315. If the maximum consumption rate 315 is not specified or the projected consumption rate is not greater, the ACL enforcer returns with an indication that the consumption is allowed. If the projected consumption rate is greater, the ACL enforcer in step 530 computes the required delay for performing this operation as (actual use 300+REQAMT)/maximum consumption rate 315–(current time–code start time 395–COMPT) and returns the required delay with an indication that the consumption has to be delayed for the computed delay.

In step 550, the ACL enforcer is invoked after the consumption of the resource with a parameter specifying the amount of resource consumed (CONSAMT). The ACL enforcer then updates the actual consumption rate 325 and the actual use 330.

It is also possible for different users to be allocated different resources and permissions in the recipient system for the same code. This can be done either at the time the code is installed, by the ACL manager by looking at the privileges given to the different users and combining that with the resources and permissions allowed to the code. In this case the set of resources and permissions for each user would have to be stored separately. During code execution the resources and permissions would be enforced on a per-user basis. Alternatively the resources and permissions can be determined during execution of the code by the ACL enforcer by looking at the privileges given to the different users and combining that with the resources and permissions allowed to the code.

FIG. 7 shows the pseudocode for the integrity verification, execution and enforcement initialization operations of the client system. It should be understood that the various tables, lists flags and other data structures described herein are instantiated in the memory of the client system (e.g. in volatile random access memory, disk or a combination of both). As previously discussed, the ACL enforcer and ACL manager are preferably embodied as program code which is linked or incorporated into the operating system of the client system. FIG. 8 shows pseudocode for the ACL manager. FIG. 9 shows pseudocode for the ACL enforcer.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

We claim:

1. A method for distributing program code comprising the steps of providing to a recipient system a trusted third party certification, the trusted third party certification including a computer readable description of resources and permissions required for verified nonharmful operation of the code, wherein the description of resources required includes data describing both a quantity of at least one resource to be used by the code and a maximum rate of consumption of at least one resource by the code.

2. The method of claim 1 wherein the providing comprises the step of encapsulating the certification with the program code.

3. The method of claim 1 comprising the further steps of reading the certification by the recipient system; and, allocating resources and permissions of the recipient system so as not to exceed the permissions specified in the certification.

4. The method of claim 2 comprising the further steps of denying or granting the code access and permissions to resources of the recipient system in further accordance with user selected options associated with the certification.

5. The method of claim 1 wherein the computer readable description of resources and permissions is provided to the recipient system in an encrypted form.

6. The method of claim 1 wherein the certification further includes encrypted verification data and wherein the recipient system decrypts the verification data to verify the integrity of the description of the resources and permissions.

7. The method of claim 3 wherein the description of permissions required includes data describing specific facilities of the recipient system to be accessed by the code.

8. The method of claim 1 wherein the third party certification includes a description of the functionality of the code as verified by the third party.

9. The method of claim 1 wherein the program code is an applet downloaded from a server as a program object.

10. The method of claim 1 wherein different users are allocated different resources and permissions in the recipient system for the same code.

11. The method of claim 10 wherein the set of resources and permissions allowed to different users is determined during installation of the code.

12. The method of claim 10 wherein the set of resources and permissions allowed to different users is determined during execution of the code.

13. A method for distributing program code comprising the steps of:
   providing a recipient system with an encrypted trusted third party certification of the program code, the trusted third party certification being encapsulated with the program code and including a computer readable description of resources and permissions required for verified non-harmful operation of the code;
   reading the certification by the recipient system:
   determining the integrity of the certification by the recipient system; and,
   only after the integrity has been verified, allocating resources and permissions of the recipient system in accordance with user selected options so as not to exceed the permissions specified in the certification; and, executing the program code in accordance with the allocating, wherein the description of resources required includes data describing both a quantity of at least one resource to be used by the code and a maximum rate of consumption of at least one resource by the code and wherein the description of permissions required includes data describing specific facilities of the recipient system to be accessed by the code.

14. A computing system, comprising:

an importation device for importing programs and data into the computing system;

an operating system for controlling the operation of the computing system;

access logic for extracting from the data and associating with a given program a computer readable description of resources required for verified non-harmful operation of the given program, the access logic further including integrity checking logic for generating verification data indicative of the integrity of the computer readable description; and, enforcement logic coupled to the operating system and responsive to the verification data for tracking and allocating for at least one resource consumption and consumption rate within the recipient system so as not to exceed the allocation specified in the description for the given program; and, a processor for executing the given program in accordance with the allocating.

15. The system of claim 14 further including a data structure stored in a random access memory and coupled to the enforcement logic, the data structure including at least a first field for tracking actual resources consumed and a second field for tracking rate of consumption of the resources, a third field for storing a limit on resource consumption derived from the description and a fourth field for storing limit on the rate of consumption of the resource derived from the description.

16. The system of claim 14 wherein the access manager includes means for de-encapsulating the description from a package including the program code and means for decrypting the description.

17. The system of claim 14 further wherein the enforcement logic includes means for denying or granting the code access and permissions to resources of the computing system in further accordance with user selected options associated with the description.

18. The method of claim 1 comprising the further step of delaying operation of the code by the recipient system to conform to the maximum rate of consumption.

19. The method of claim 13 comprising the further step of delaying operation of the code by the recipient system to conform to the maximum rate of consumption.

20. The computing system of claim 14, wherein the enforcement logic includes means for delaying operation of the given program to conform to the consumption rate.

* * * * *